United States Patent
Kobayashi et al.

(10) Patent No.: US 7,667,927 B2
(45) Date of Patent: Feb. 23, 2010

(54) MAGNETIC HEAD HAVING TOROIDAL COIL LAYER AND MANUFACTURING METHOD THEREOF

(75) Inventors: Kiyoshi Kobayashi, Niigata-ken (JP); Toru Takahashi, Niigata-ken (JP)

(73) Assignee: TDK Corporation, Tokyo (JP)

(*) Notice: Subject to any disclaimer, the term of this patent is extended or adjusted under 35 U.S.C. 154(b) by 522 days.

(21) Appl. No.: 11/296,192

(22) Filed: Dec. 6, 2005

(65) Prior Publication Data
US 2006/0126221 A1 Jun. 15, 2006

(30) Foreign Application Priority Data
Dec. 10, 2004 (JP) ............... 2004-357591

(51) Int. Cl.
G11B 5/17 (2006.01)
(52) U.S. Cl. ............... 360/123.06; 360/123.1
(58) Field of Classification Search .................
360/123.02–123.12
See application file for complete search history.

(56) References Cited

U.S. PATENT DOCUMENTS

| 5,173,826 | A * | 12/1992 | Bischoff ............... 360/123.39 |
| 5,703,740 | A * | 12/1997 | Cohen et al. ........... 360/125.35 |
| 5,969,911 | A * | 10/1999 | Hikami et al. ............. 360/317 |
| 5,995,342 | A * | 11/1999 | Cohen et al. ........... 360/125.35 |
| 6,441,994 | B1 * | 8/2002 | Wang et al. ............ 360/123.39 |
| 6,729,012 | B1 * | 5/2004 | Sasaki ..................... 29/603.07 |
| 2003/0189788 | A1 * | 10/2003 | Kamijima .................. 360/126 |
| 2004/0085684 | A1 * | 5/2004 | Basra et al. ................. 360/317 |
| 2004/0100731 | A1 * | 5/2004 | Sato ........................... 360/126 |

FOREIGN PATENT DOCUMENTS

| JP | 61-085612 | 5/1986 |
| JP | 5-342529 | 12/1992 |
| JP | 5-242429 | 9/1993 |
| JP | 5-250636 | 9/1993 |
| JP | 05242429 A * | 9/1993 |
| JP | 05250636 A * | 9/1993 |
| JP | 07-153026 | 6/1995 |
| JP | 2004-158176 | 6/2004 |

OTHER PUBLICATIONS

Office Action for corresponding Japanese Patent Application Serial No. 2004-357591, dated Dec. 17, 2007.

* cited by examiner

*Primary Examiner*—Wayne R Young
*Assistant Examiner*—Adam B Dravininkas
(74) *Attorney, Agent, or Firm*—Brinks Hofer Gilson & Lione

(57) ABSTRACT

First and second magnetic layers of a magnetic head face each other. A toroidal coil layer having upper and lower layer coil pieces (ULCP and LLCP) is wound around one of the magnetic layers. The ULCP extend from a first insulating layer by downward steps to a top of a second insulating layer which is widened at ends of the first insulating layer. Side ends of the first insulating layer extend parallel to a height direction. The ULCP are orthogonal to the side ends. Each of the LLCP is formed on a third insulating layer and has a straight region extending in the same direction as the upper layer coil pieces and a curved region curved toward a facing surface or in a height direction on one end in the track width direction. An end of each of the straight and curved region is connected to an ULCP.

3 Claims, 12 Drawing Sheets

X ← ⊗Y

MAGNETIC HEAD HAVING TOROIDAL COIL LAYER AND MANUFACTURING METHOD THEREOF

BACKGROUND OF THE INVENTION

1. Field of the Invention

The present invention relates to a toroidal coil layer having, particularly, lower layer coil pieces and upper layer coil pieces, and formed to be wound around a magnetic layer as an axis, and more specifically, to a magnetic head and a manufacturing method thereof capable of forming upper layer coil pieces to be formed on an insulating layer having a step in a predetermined shape with high precision, reducing the yoke length, and improving the recording efficiency.

2. Description of the Related Art

The structure of a toroidal coil layer, which is formed to be wound around the magnetic layer using one magnetic layer serving as an axis, is disclosed in JP-A-5-242429, JP-A-5-250636 and JP-A-5-342529(hereinafter, referred as to "cited references").

As disclosed in the cited references, the toroidal coil layer is configured to have lower layer coil pieces formed below a magnetic layer serving as an axis and upper layer coil pieces above the magnetic layer. Also, ends of the lower layer coil pieces and ends of the upper layer coil pieces are provided to face each other in a thin film thickness, and these ends are electrically connected to each other, thereby forming a toroidal coil layer.

For example, FIG. 15 shows a conventional shape of the lower layer coil pieces, and FIG. 16 shows a conventional shape of the upper layer coil pieces. Both of FIGS. 15 and 16 are partial plan views of the upper layer coil pieces and the lower layer coil pieces.

As shown in FIG. 15, a plurality of lower layer coil pieces 1 are arrayed in a height direction (Y-direction) from the facing surface to a recording medium (a direction opposite to the Y-direction in the drawing). Each lower layer coil piece 1 is formed in a shape symmetrical with respect to a centerline A drawn in the height direction from almost the center in a track width direction (X-direction in the drawing). As shown in FIG. 15, each lower coil piece 1 is composed of a straight region 1a extending in a direction parallel to the track width direction (X-direction in the drawing) and curved regions 1b curved in the height direction (Y-direction) from both ends of the straight region 1a, and ends 1c of the curved regions 1b of each lower layer coil piece 1 become connecting spots with the upper layer coil pieces 2.

As shown in FIG. 16, a plurality of upper layer coil pieces 2 are arrayed in a height direction (Y-direction) from the facing surface to a recoding medium (a direction opposite to the Y-direction in the drawing). Each upper coil piece 2 is composed of a straight region 2a extending in a direction substantially parallel to the track width direction (X-direction in the drawing) and a curved region 2b curved in the height direction (Y-direction) from a lower end (in the drawing) of the straight region 2a, and both ends 2c of each upper layer coil pieces 2 become connecting spots with the lower layer coil pieces 1.

As shown in the cited references, each upper layer coil piece 2 is formed from a swelled coil insulating layer 3 covering a magnetic layer as an axis to an insulating layer 4 which is widened on both sides of the coil insulating layer 3 and is one-step lower than the coil insulating layer 3.

An end of a lower layer coil piece 1 shown in FIG. 15 and denoted by the character "B" is electrically connected to an end 2c of an upper layer coil piece 2 denoted by the character "B", an end 1c of a lower layer coil piece 1 denoted by the character "C" is electrically connected to an end 2c of the upper layer coil piece 2 denoted by the character "C", an end 1c of the lower layer coil piece 1 denoted by the character "D" is electrically connected to an end 2c of an upper layer coil piece 2 denoted by the character "D", and an end 1c of the lower layer coil piece 1 denoted by the character "E" is electrically connected to an end 2c of the upper layer coil piece 2 denoted by the character "E". If ends 1c and 2c of the other lower and upper layer coil pieces 1 and 2 are electrically connected to each other in this way, a toroidal coil layer is completed.

Otherwise, as shown in the cited references (for example, refer to FIG. 2 of JP-A-5-242429 and FIG. 2 of JP-A-5-342529), all the upper layer coil pieces 2 are formed in a shape extending in the direction parallel to the track width direction (X-direction in the drawing), while the lower layer coil pieces 1 are formed in a shape inclined in the height direction (Y-direction in the drawing) with respect to the track width direction. Also, the ends 2c of the upper layer coil pieces 2 and the ends 1c of the lower layer coil pieces 1 are electrically connected to each other, respectively, thereby completing a toroidal coil layer.

However, the toroidal coil layer composed of the lower layer coil pieces 1 and the upper layer coil pieces 2 shown in FIGS. 15 and 16, and a toroidal coil layer composed of lower layer coil pieces 1 and upper layer coil pieces 2 shown in FIG. 17 have the following problems, respectively.

The toroidal coil layer composed of the lower layer coil pieces 1 and the upper layer coil pieces 2 shown in FIGS. 15 and 16, has a problem in that the upper layer coil pieces 2 cannot be formed in a predetermined shape with high precision.

FIG. 17 is a manufacturing process view showing a process of manufacturing the upper layer coil pieces 2, and a partial sectional view of a magnetic head during the manufacturing process when the magnetic head is cut along a line I-I (the line I-I runs along an end of the coil insulating layer 3 in the track width direction) shown in FIG. 16 and is viewed from the direction of arrows.

As shown in FIG. 17, a resist layer 5 is coated from the top of the insulating layer 4 to the top of the coil insulating layer 3, and a punched pattern 5a having the same shape as the upper layer coil pieces 2 is formed in the resist layer 5 by exposure development.

Meanwhile, as described above, the coil insulating layer 3 has a shape that is swelled upwardly from the surface of the insulating layer 4. For this reason, as shown in FIG. 18, a step P is formed between both side ends 3a of the coil insulating layer 3 in the track width direction (X-direction in the drawing) and the surface of the insulating layer 4. In addition, FIG. 18 is a partial sectional view of a magnetic head during the manufacturing process when the magnetic head is cut along a line II-II shown in FIG. 16 and is viewed from the direction of arrows.

Each upper layer coil piece 2, as described referring to FIG. 16, is composed of a straight region 2a and a curved region 2b, and a portion of the curved region 2b is formed to be just caught by the step P. Also, since the curved regions 2b are disposed obliquely with respect to the direction (Y-direction in the drawing) that the end 3a of the coil insulating layer 3 extends, the punched pattern of the curved regions 2b cannot be formed with high precision due to irregular reflection as shown in FIG. 18, which may be caused in the step P in exposure development when the punched pattern of the curved regions 2b is formed.

As specific problems, adjacent upper layer coil pieces 2 are electrically connected to each other in the curved regions 2b, or defective portions such as holes are formed in the curved regions 2b.

Meanwhile, in the case of the toroidal coil layer shown in FIG. 19, particularly, the lower layer coil pieces 1 are obliquely arranged in the height direction (Y-direction in the drawing) from a direction parallel to the track width direction (X-direction in the drawing). Therefore, a formation region of the lower layer coil pieces 1 is widened in the height direction (Y-direction in the drawing). As a result, a problem occurs in that the yoke length of a magnetic layer may easily increase. Also, there is a problem that the recording efficiency may deteriorate due to an increase in inductance caused by an increase in the yoke length.

SUMMARY OF THE INVENTION

Therefore, the invention has been made to solve the above problems. It is an object of the invention to provide a magnetic head and a manufacturing method thereof capable of forming upper layer coil pieces to be formed on an insulating layer having a step in a predetermined shape with high precision, reducing the yoke length, and improving the recording efficiency.

According to one aspect of the present invention, there is provided a magnetic head including a first magnetic layer, a second magnetic layer facing the first magnetic layer with a predetermined distance above the first magnetic layer, and a toroidal coil layer formed to be wound around either the first magnetic layer or the second magnetic layer, serving as an axis.

The toroidal coil layer has a plurality of lower layer coil pieces provided below a magnetic layer serving as an axis and arrayed in a height direction from a facing surface to a recording medium, and a plurality of upper layer coil pieces provided above the magnetic layer as an axis and arrayed in the height direction from the facing surface. Ends of the lower layer coil pieces in a track width direction are electrically connected to ends of the upper layer coil pieces in the track width direction, respectively.

The upper layer coil pieces are formed to extend from the top of the first insulating layer via downward steps on both sides in the track width direction to the top of a second insulating layer which is widened at both ends of a first insulating layer. At least in a region where the upper layer coil pieces are formed, both side ends of the first insulating layer in the track width direction extend in a direction parallel to the height direction. The lower layer coil pieces are formed on a third insulating layer.

The upper layer coil pieces are formed in a direction orthogonal to a direction that both side ends of the first insulating layer extend.

Each of the lower layer coil pieces is formed on the third insulating layer so as to have a straight region extending in the same direction as the direction that the upper layer coil pieces extend and a curved region curved toward the facing surface or in the height direction, on one end in the track width direction.

An end of the straight region is electrically connected to one end of each of the upper coil layer coil pieces, and an end of the curved region is electrically connected to the other end of each of the upper layer coil pieces.

As described above, the upper layer coil pieces are formed in a direction orthogonal to a direction that both side ends of the first insulating layer extend. Moreover, each of the lower layer coil pieces is formed on the third insulating layer so as to have a straight region extending in the same direction as the upper layer coil pieces. As a result, the upper layer coil pieces can be formed in a predetermined shape from the top of the first insulating layer having a step to the top of the second insulating layer, and the yoke length can be reduced.

In the above aspect of the invention, it is preferable that a connecting layer be formed on the straight region and the curved region so as to protrude upward, an upper surface of the connecting layer be formed with the same surface as the upper surface of the second insulating layer, and the ends of the upper layer coil pieces be electrically connected to the upper surface of the connecting surface. This allows an electrical connection between the lower layer coil pieces and the upper layer coil pieces to be surely established with a simple structure.

Further, in the above aspect of the invention, it is preferable that a coil formation surface of the third insulating layer be formed as a planarized surface. This allows the pattern of the lower layer coil pieces to be formed with high precision.

In another aspect of the invention, there is provided a method of manufacturing a magnetic head.

The magnetic head includes a first magnetic layer, a second magnetic layer facing the first magnetic layer with a predetermined distance above the first magnetic layer, and a toroidal coil layer formed to be wound around either the first magnetic layer or the second magnetic layer, serving as an axis.

The toroidal coil layer has a plurality of lower layer coil pieces provided below the magnetic layer serving as an axis and arrayed in a height direction from a facing surface to a recording medium, and a plurality of upper layer coil pieces provided above the magnetic layer serving as the axis and arrayed in the height direction from the facing surface.

Ends of the lower layer coil pieces in a track width direction are electrically connected to ends of the upper layer coil pieces in the track width direction, respectively.

The method of manufacturing a magnetic head includes the following steps:

(a) forming the lower layer coil pieces on a third insulating layer, and at this time, constituting each of the lower coil pieces with a straight region extending in a direction parallel to the track width direction and a curved region curved toward the facing surface or in the height direction from one end of the straight region, (b) covering the lower layer coil pieces with a second insulating layer, (c) forming the magnetic layer serving as the axis on the second insulating layer, (d) forming a first insulating layer on the magnetic layer, and at this time, forming both side ends of the first insulating layer in the track width direction at least in a region where the upper layer coil pieces are formed so as to extend in a direction parallel to the height direction, and (e) forming the upper layer coil pieces in the track width direction that is a direction orthogonal to both side ends of the first insulating layer, forming the upper layer coil pieces from both side ends of the first insulating layer by a downward step to the second insulating layer which is widened on both ends of the first insulating layer, electrically connecting an end of the straight region to one end of each of the upper coil layer coil pieces, and electrically connecting an end of the curved region to the other end of each of the upper layer coil pieces.

In the above aspect of the invention, it is preferable that, between steps (a) and (b), a connecting layer be formed to protrude to the ends of the lower layer coil pieces, during step (b), an upper surface of the connecting layer be exposed through an upper surface of the second insulating layer, and during step (e), the ends of the upper layer coil pieces overlap the exposed upper surface of the connecting layer.

In the above aspect of the invention, it is preferable that during step (b), an upper surface of the connecting layer be subjected to planarizing.

Further, in the above aspect of the invention, it is preferable that during step (e), a resist layer be formed from the top of the first insulating layer to the top of the second insulating layer, the resist layer be exposed and developed so that a punched pattern of the upper layer coil pieces is formed on the resist layer, the upper layer coil pieces be plated within the punched pattern, and then the resist layer be removed.

In the above aspect of the invention, it is preferable that the coil insulation base layer be formed of an organic insulating material.

According to the invention, during step (e), a resist layer is formed from the top of the first insulating layer to the top of the second insulating layer, and when the resist layer is exposed and developed so as to form a punched pattern of the upper layer coil pieces in the resist layer, the punched pattern of the upper layer coil pieces is formed in a direction orthogonal to the direction that both side ends of the first insulating layer in the track width direction extend. Therefore, it is possible to suppress deterioration in pattern precision of the punched pattern caused by irregular deflection as in the related art, and it is possible to form the upper layer coil pieces with high precision. Moreover, since each lower layer coil piece is formed to have a straight region extending in the direction parallel to the track width direction during the step (a), each lower layer coil piece can be formed as nearer to the facing surface as possible, and the length, in the height direction, of the region where the lower layer coil pieces are formed can be reduced. As a result, the yoke length of the magnetic layer can be reduced.

DESCRIPTION OF THE PREFERRED EMBODIMENT

Figure 1:
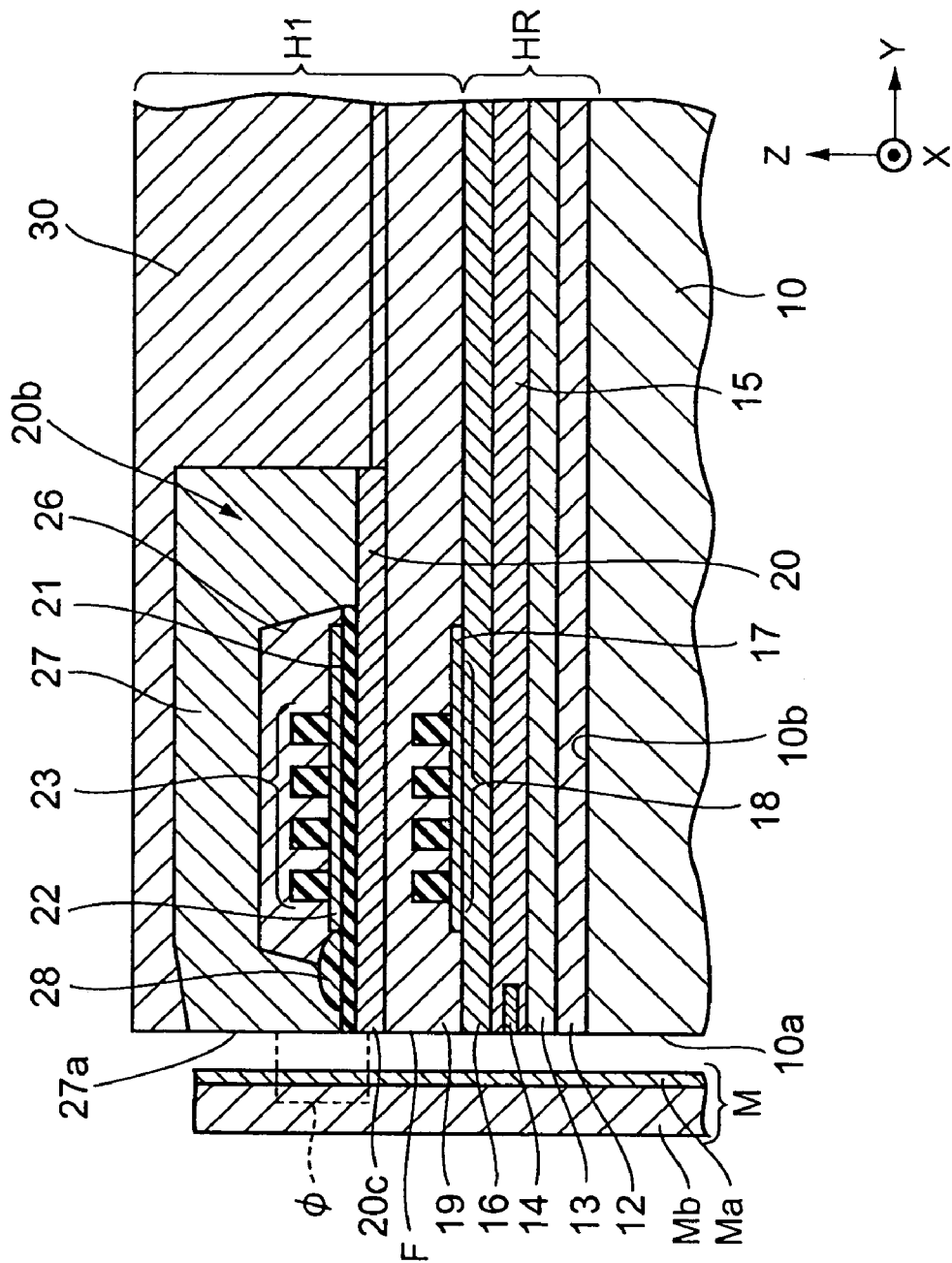
FIG. 1 is a partial longitudinal sectional view of a vertical magnetic recording head of the invention.
Figure 2:
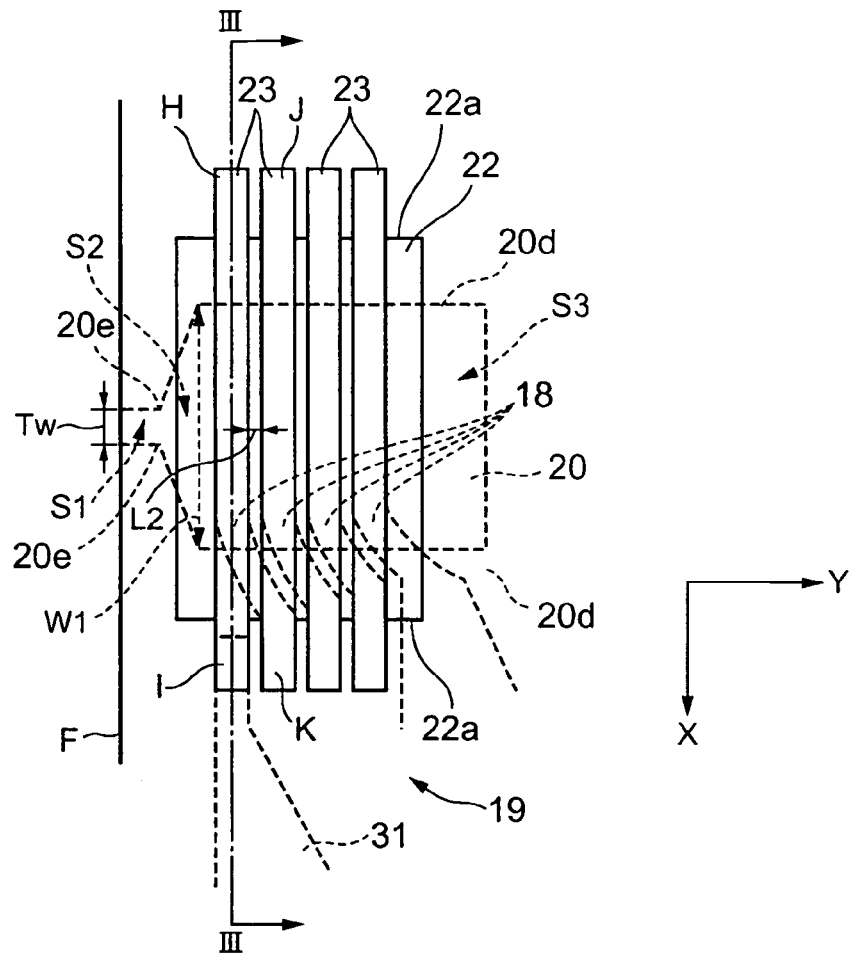
FIG. 2 is a partial plan view of the vertical magnetic recording head shown in FIG. 1.
Figure 3:
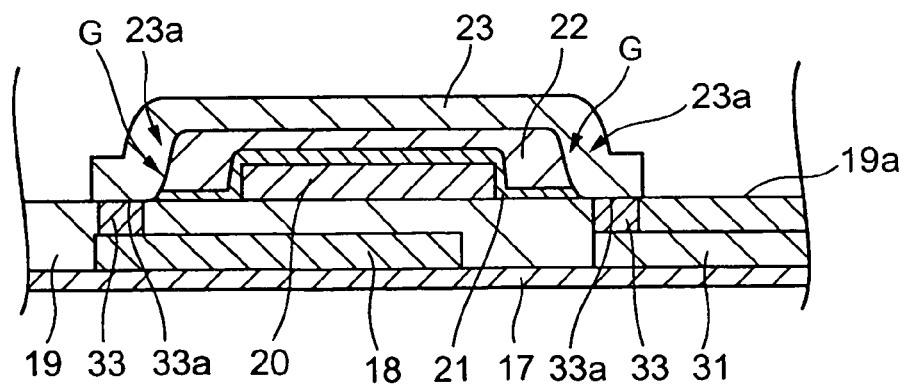
FIG. 3 is a partial sectional view when the vertical magnetic recording head shown in FIG. 1 is cut along a line III-III, and the section is viewed from the direction of arrows.
Figure 4:
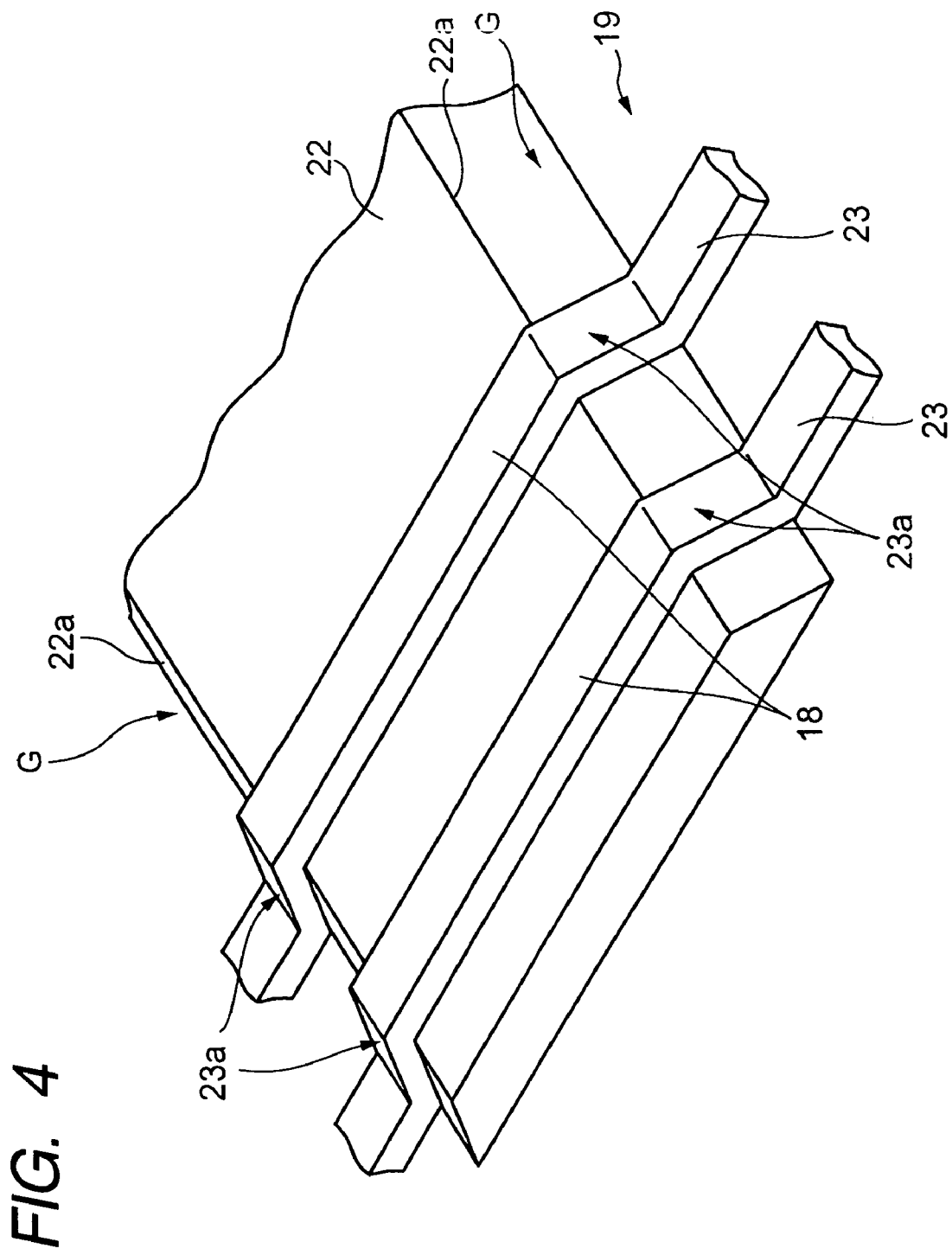
FIG. 4 is a partial perspective view for explaining the shape of, particularly, the upper layer coil pieces.
Figure 5:
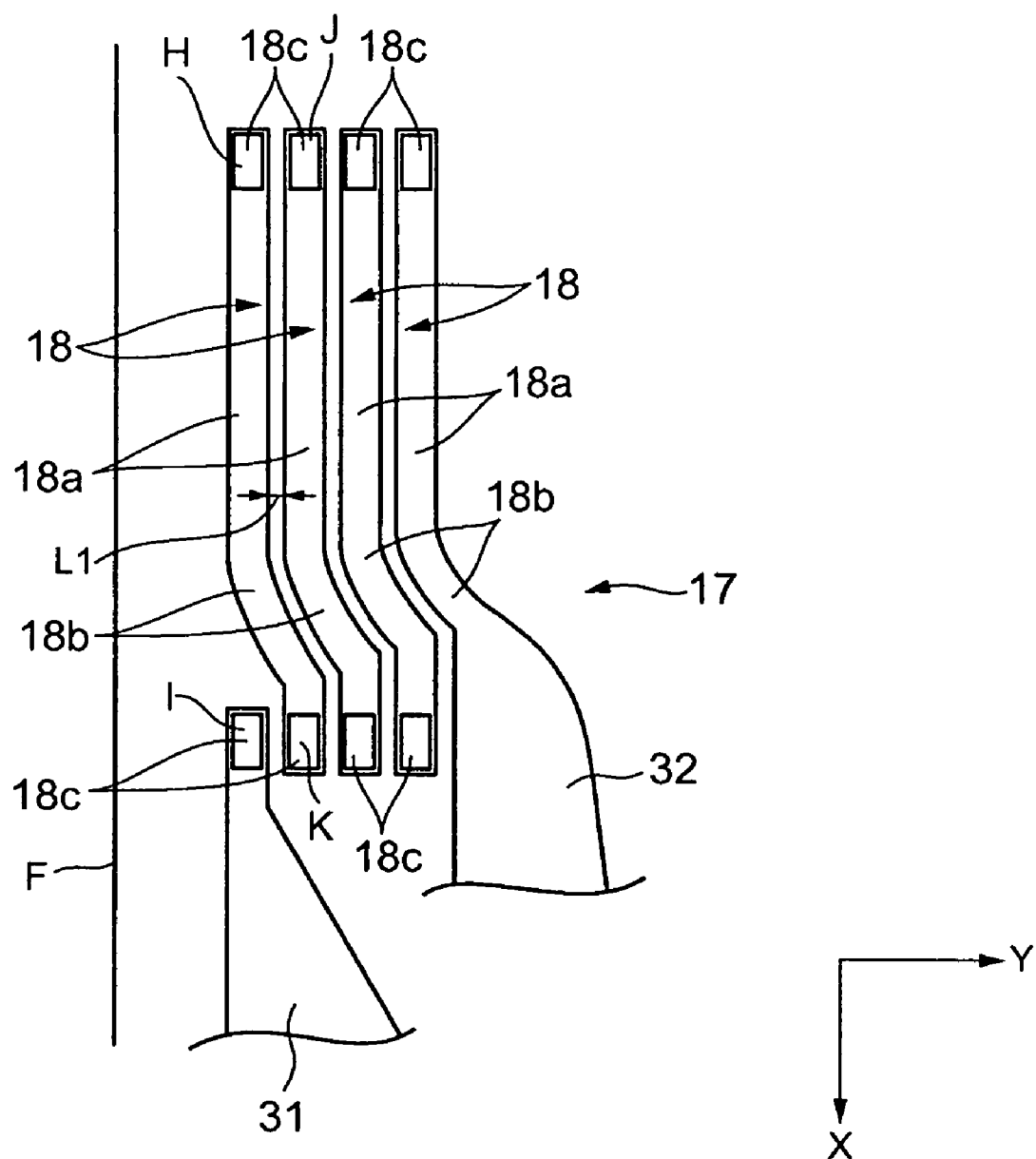
FIG. 5 is a partial plan view for explaining the shape of lower layer coil pieces.

FIG. 1 is a partial longitudinal sectional view of a vertical magnetic recording head of the invention, FIG. 2 is a partial plan view of the vertical magnetic recording head shown in FIG. 1, FIG. 3 is a partial sectional view when the vertical magnetic recording head shown in FIG. 2 is cut along line III-III, and the section is viewed from the direction of arrows, FIG. 4 is a partial perspective view for explaining the shape of, in particular, the upper layer coil pieces, and FIG. 5 is a partial plan view for explaining the shape of lower layer coil pieces.

Hereinafter, the X-direction in the drawing is called a track width direction, and the Y-direction in the drawing is called a height direction. In addition, the facing surface F to a recording medium is formed in a direction parallel to a surface composed of the track width direction (X-direction in the drawing) and a film width direction (Z-direction in the drawing). In addition, the "ends" refer to both side ends in the track width direction, as long as it is not particularly defined. In addition, the "downside" refers to an opposite direction to the film thickness direction (Z-direction in the drawing), as long as it is not particularly defined, and the "upside" refers to the film thickness direction (Z-direction in the drawing), as long as it is not particularly defined.

A vertical magnetic head H1 shown in FIG. 1 gives a vertical magnetic field to a recording medium M to magnetize a hard film Ma of the recording medium M in the vertical direction.

The recording medium M is like, for example, a disc, and has the hard film Ma of a high residual magnetization on its surface and a soft film Mb of a high magnetic permeability inside thereof. The recording medium is rotated around the center of the disc as a rotation axis.

A slider 10 is formed of a non-magnetic material such as $Al_2O_3$.TiC. A facing surface 10a of the slider 10 faces the recording medium M. When the recording medium M rotates, the slider 10 floats from the recording medium M by airflow on its surface, or slides on the recording medium M.

A trailing end surface 10b (upper surface) of the slider 10 is formed with a non-magnetic insulating layer 12 formed of an inorganic material such as $Al_2O_3$ or $SiO_2$, and a read portion $H_R$ is formed on the non-magnetic insulating layer 12.

The read portion HR includes a lower shield layer 13, an upper shield layer 16, and a read element 14 located inside an inorganic insulating layer 15 (gap insulating layer) between the lower shield layer 13 and the upper shield layer 16. The read element 14 is a magneto-resistance effect element such as AMR, GMR, or TMR.

A plurality of lower layer coil pieces 18 formed of a conductive material is formed on the upper shield layer 16, with a coil insulation base layer 17 (third insulating layer) between the lower layer coil pieces and the upper shield layer. The lower layer coil pieces 18 are formed of at least one or two kinds of non-magnetic metallic materials selected from, for example, Au, Ag, Pt, Cu, Cr, Al, Ti, NiP, Mo, Pd, and Rh. Alternatively, the lower layer coil pieces may be a laminated structure in which the non-magnetic metallic materials are laminated.

Around the lower layer coil pieces 18, a coil insulating layer (second insulating layer) 19 formed of an inorganic insulating material such as $Al_2O_3$ or an organic insulating material such as resist is formed.

An upper surface of the coil insulating layer 19 is formed as a planarized surface, and a plated base layer (not shown) is formed on the upper surface. A main magnetic pole layer 20 is formed on the plated base layer with a predetermined length in the height direction (Y-direction in the drawing) from the facing surface F to the recording medium (hereinafter simply referred to as "facing surface F"). The width of a front end surface 20c of the main magnetic pole layer in the track width direction (X direction in the drawing) is a track width Tw.

The main magnetic pole layer 20 is, for example, plated with a ferromagnetic material, and is formed of a material having a high saturation magnetic flux density, such as Ni—Fe, Co—Fe, or Ni—Fe—Co.

As shown in FIG. 2, the main magnetic pole layer 2 has a rear portion S3, and an inclined portion S2 which extends in the height direction (Y direction in the drawing) from a base end 20e of the front portion S1 so that the width W1 of the main magnetic pole layer in the track width direction (X-direction in the drawing) is wider than the track width Tw. As shown in FIG. 2, both side ends 20d of the rear portion S3 of the main magnetic pole layer 20 in the track width direction (X-direction in the drawing) are formed to extend in the direction parallel to the height direction (Y-direction in the drawing). In addition, in the configuration of the main magnetic pole layer 20 shown in FIG. 2, the front portion S1 is sometimes called the main magnetic pole layer, and the inclined portion S2 and the rear portion S3 are sometimes called a yoke layer.

Specifically, the track width Tw is in a range of 0.01 μm to 0.5 μm, and the length of the front portion S1 in the height direction is in a range of 0.01 μm to 0.5 μm.

Also, the largest width W1 of the rear portion S3 in the track width direction (X-direction in the drawing) is about 1 μm to 100 μm, and the length of the inclined portion S2 and the rear portion S3 in the height direction is about 1 μm to 100 μm.

A gap layer 21 is formed of an inorganic material such as alumina or $SiO_2$ on the main magnetic pole layer 20. The gap layer 21 may be formed of a noble metal such as Au or Pt, or may be a laminated structure of an inorganic material and/or the noble meal.

As shown in FIG. 1, upper layer coil pieces 23 are formed on the gap layer 21, with a coil insulation base layer (first insulating layer) 22 therebetween. Similar to the lower layer coil pieces 18, a plurality of the upper layer coil pieces 23 are formed of a conductive material. The upper layer coil pieces 23 are formed of at least one or two kinds of non-magnetic metallic materials selected from, for example, Au, Ag, Pt, Cu, Cr, Al, Ti, NiP, Mo, Pd, and Rh. Alternatively, the upper layer coil pieces may be a laminated structure in which the non-magnetic metallic materials are laminated.

In the lower layer coil pieces 18 and the upper layer coil pieces 23, their respective ends in the track width direction (X-direction in the drawing) are electrically connected to each other so as to form a toroidal shape.

Around the upper layer coil pieces 23, a coil insulating layer 26 is formed of an inorganic insulating material such as $Al_2O_3$ or an organic insulating material such as resist. From the top of the coil insulating layer 26 to the top of the gap layer 21, a return path layer 27 is formed of a ferromagnetic material such as permalloy. A rear end of the return path layer 27 in the height direction is a connecting portion 20b which is electrically connected to the main magnetic pole layer 20. In addition, on the gap layer 21, a Gd defining layer 28 is formed of an inorganic or organic material at a position away from the facing surface F at a predetermined distance. The distance from the facing surface F to a front edge of the Gd defining layer 28 defines a gap depth of the magnetic head H1.

As shown in FIG. 1, the return path layer 27 is covered with a protective layer 30 formed of an inorganic non-magnetic insulating material, etc.

The thickness of the front end surface 20c of the main magnetic pole layer 20 is smaller than the thickness of a front end surface 27a of the return path layer 27, and a width Tw of the front end surface 20c of the main magnetic pole layer 20 in the track width direction X-direction in the drawing) is sufficiently smaller than the width of the front end surface 27a of the return path layer 27 in the same direction. As a result, in the facing surface F, the area of the front end surface 20c of the main magnetic pole layer 20 is sufficiently smaller than the area of the front end surface 27a of the return path layer 27. Accordingly, magnetic fluxes of a leaked recording magnetic field are concentrated on the front end surface 20c of the main magnetic pole layer 20, and the hard film Ma is magnetized in the vertical direction by the concentrated magnetic fluxes, so that the magnetic data is recorded.

The characteristic parts of the invention will be described below. First, the shape of the lower layer coil pieces 18 will be described. As shown in FIGS. 1, 3 and 5, lower layer coil pieces 18 are formed on the coil insulation base layer (third insulating layer) 17. It is preferable that an upper surface of the coil insulation base layer 17 be a planarized surface. This makes it possible to pattern the lower layer coil pieces 18 on the coil insulation base layer 17 with high precision.

For example, as shown in FIG. 5, a plurality of the lower layer coil pieces 18 are provided at almost predetermined intervals in the height direction (Y-direction in the drawing) from the facing surface F. The lower layer coil pieces 18 are plated. In addition to the lower layer coil pieces 18, a lead layer 31 is plated on the coil insulation base layer 17 on the side of the facing surface F, and another lead layer 32 is plated integrally with a lower layer coil piece 18 provided at the highest position.

As shown in FIG. 5, each lower layer coil piece 18 is composed of a straight region 18a extending in the direction parallel to the track width direction X-direction in the drawing), and a curved region 18b curved in the height direction (Y-direction in the drawing) from a lower end (in the drawing) of the straight region 18a. Portions of the both side ends of each lower layer coil piece 18 in the track width direction (X-direction in the drawing) become connection regions 18c to the upper layer coil pieces 23. The connection region 18c is also provided at one end of the lead layer 31, and the lead layer 32 formed to extend integrally with the lower layer coil piece 18 formed at the highest position is not provided with the connection region 18c to the upper layer coil pieces 23. As shown in FIG. 5, the connection regions 18c formed in the lower layer coil pieces 18 and the lead layer 31 are arranged in a line in the direction parallel to the height direction (Y-direction in the drawing) on both sides in the track width direction X-direction in the drawing). On the connection regions 18c, connection regions on the side of the upper layer coil pieces 23 faces in the film thickness direction (Z-direction in the drawing).

Figure 17:
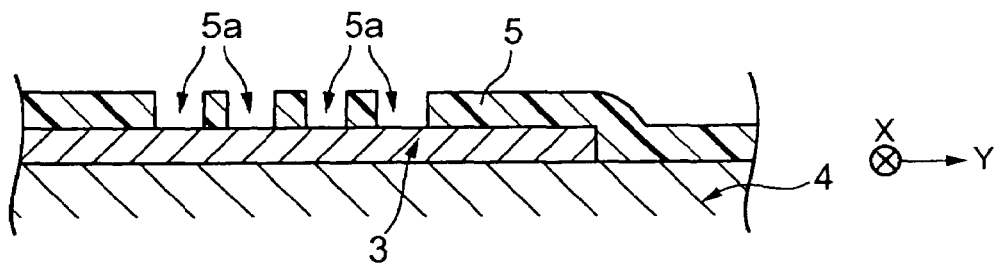
FIG. 17 is a manufacturing process view showing a manufacturing process of upper layer coil pieces in the related art, and a partial sectional view of a magnetic head during the manufacturing process when the magnetic head is cut along line I-I (the line I-I runs along an end of a coil insulating layer 3 in the track width direction) shown in FIG. 16 and is viewed from the direction of arrows.
Figure 18:
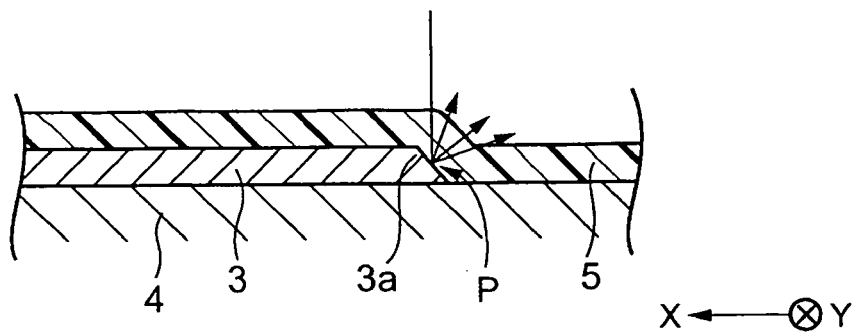
FIG. 18 is a manufacturing process view showing a manufacturing process of upper layer coil pieces in the related art, and a partial sectional view of a magnetic head during the manufacturing process when the magnetic head is cut along line II-II shown in FIG. 16 and is viewed from the direction of arrows.
Figure 19:
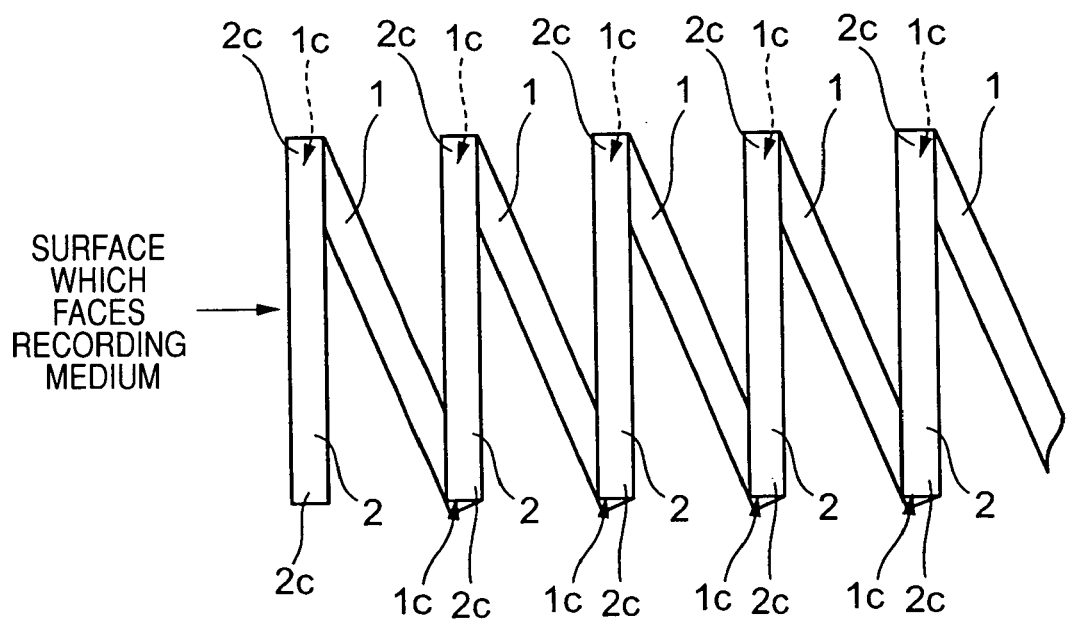
FIG. 19 is a partial plan view of a toroidal coil layer in the related art.

The interval L1 between the lower layer coil pieces 18 is in a range of 0.1 μm to 1.5 μm. Also, the lower layer coil pieces 18 are respectively formed with the straight regions 18a extending in the direction parallel to the track width direction (X-direction in the drawing), and the straight regions 18a are arrayed in the height direction at an interval of L1. Thereby, the length of a region where the lower layer coil pieces 18 are formed in the height direction can be reduced as compared with the configuration in which the lower layer coil pieces shown in FIG. 17 are arranged obliquely from the track width direction. It is preferable to form the lower layer coil pieces 18 below the main magnetic pole layer 20 so that only the straight regions 18a of the lower layer coil pieces 18 exist below the main magnetic pole layer 20. In other words, it is preferable to control the size of the main magnetic pole layer 20 and the length of the straight regions 18a of the lower layer coil pieces 18 so that the main magnetic pole layer 20 does not overlap the curved regions 18b of the lower layer coil pieces 18. If it is configured such that only the straight regions 18a of the lower layer coil pieces 18 exist below the main magnetic pole layer 20, the length of the main magnetic pole layer 20 in the height direction can be effectively reduced.

As shown in FIG. 3, a connecting layer 33 is formed on the connecting regions 18c of the lower layer coil pieces 18 and the lead layer 31 so as to protrude upward. The connecting layer 33 is formed by, for example, plating. The connecting layer 33 is formed of a conductive material. The connecting layer 33 is formed of at least one or two kinds of non-magnetic metallic materials selected from, for example, Au, Ag, Pt, Cu, Cr, Al, Ti, NiP, Mo, Pd, and Rh. Alternatively, the connecting layer may be a laminated structure in which the non-magnetic metallic materials are laminated.

As shown in FIG. 3, an upper surface 19a of the coil insulating layer 19 (second insulating layer) to cover the lower layer coil pieces 18 and the lead layer 31 is formed as a planarized surface. Also, an upper surface 33a of the connecting layer 33 is exposed through the upper surface 19a.

As shown in FIGS. 2 and 3, the above-described main magnetic pole layer 20 is plated on the coil insulating layer 19. Also, the gap layer 21 is formed on the main magnetic pole layer 20, and the coil insulation base layer (first insulating layer) 22 is formed on the gap layer 21. Even though the coil insulation base layer 22 may be formed of either an inorganic insulating material or an organic insulating material, it is preferable that the coil insulation base layer be formed of, particularly, an organic insulating material such as resist. By forming the coil insulation base layer 22 of the organic insulating material, it is easy to partially form the coil insulation base layer 22 at a predetermined position.

Since the main magnetic pole layer 20 is formed on the planarized coil insulating layer 19, and the coil insulation base layer 22 to cover the main magnetic pole layer 20 is partially formed from the top of the main magnetic pole layer 20 to the top of the coil insulating layer 19, steps G are formed between both side ends 22a of the coil insulation base layer 22 in the track width direction and the coil insulating layer 19.

The both side ends 22a of the coil insulation base layer 22 are formed to extend in the direction parallel to the height direction (Y-direction in the drawing) as shown in FIG. 2. The both side ends 22a of the coil insulation base layer 22 are formed to extend in a direction parallel to the height direction (Y-direction in the drawing) at least in a region where the upper layer coil pieces 23 are formed, as will be described below. In order to form the both side ends 22a of the coil insulation base layer 22 in the formation region of the upper layer coil pieces 23 so as to extend in the direction parallel to the height direction (Y-direction in the drawings) as described above, if the both side ends 20d of the main magnetic pole layer 20 below the formation region of the upper layer coil pieces 23 are formed to extend in the direction parallel to the height direction, the both side ends 22a of the coil insulation base layer 22 formed to overlap the main magnetic pole layer 20 are easily formed so as to extend in the direction parallel to the height direction (Y-direction in the drawing). In FIG. 2, the coil insulation base layer 22 is formed to overlap the rear portion S3 of the main magnetic pole layer 20. In the rear portion S3, the both side ends 22a of the coil insulation base layer are formed to extend in the direction parallel to the height direction (Y-direction in the drawing), and thus the both side ends 22a of the coil insulation base layer 22 formed to overlap the rear portion S3 is easily formed to extend in the direction parallel to the height direction (Y-direction in the drawing).

As shown in FIGS. 2, 3 and 4, a plurality of upper layer coil pieces 23 are provided in the height direction (Y-direction in the drawing) from the facing surface F, and the upper layer coil pieces 23 are respectively formed in the direction parallel to the track width direction (X-direction in the drawing). The upper layer coil pieces 23 are respectively formed at an interval of L2. The interval L2 is in a range of 0.1 μm to 1.5 μm. The interval L2 is almost the same as the interval L1 in the lower layer coil pieces 18, which allows the upper layer coil pieces 23 and the lower layer coil pieces 18 to face each other in the thickness direction (Z-direction in the drawing). As shown in FIGS. 3 and 4, the upper layer coil pieces 23 are formed from the top of the coil insulation base layer 22 to the top of the coil insulating layer 19 which is widened by the downward steps G on the both sides. Thus, the both side ends 23a of the upper layer coil pieces 23 in the track width direction (X-direction in the drawing) are formed in the shape of a curve which is curved downward, so that the both side ends 23a formed to extend to the top of the coil insulating layer 19 are electrically connected to an exposed surface of the connecting layer 33 which is exposed above the coil insulating layer 19.

As shown in FIGS. 2 and 5, a connecting region 18c, which is located at an upper end (in the drawing) of a lower layer coil piece 18 provided nearest to the facing surface F and is denoted by the character "H", and a connecting region 23c, which is located at an upper end (in the drawing) of an upper layer coil piece 23 provided nearest to the facing surface F and denoted by the character "H", face each other in the film thickness direction and are electrically connected to each other through the connecting layer 33. Further, a connecting region "I" at the end of the lead layer 31 provided on the side of the facing surface F and a connecting region "I" at a lower end (in the drawing) of the upper layer coil piece 23 provided nearest to the facing surface F face each other in the film thickness direction and are electrically connected to each other through the connecting layer 33. Further, a connecting region J at an upper end (in the drawing) of a lower layer coil piece 18 in the second column when being numbered in the height direction from the facing surface F, and a connecting region J at an upper end (in the drawing) of an upper layer coil piece 23 in the second column when being numbered from the facing surface F, face each other in the thickness direction and are electrically connected to each other through the connecting layer 33. Moreover, a connecting region K at a lower end (in the drawing) of the lower layer coil piece 18 provided nearest to the facing surface F, and a connecting region K at a lower end (in the drawing) of the upper layer coil piece 23 in the second column when being numbered from the facing surface F, face each other in the thickness direction and are electrically connected to each other through the connecting layer 33. In this way, at the upper end in the drawing, the ends of the upper layer coil piece 23 and the lower layer coil piece 18 in the same column when being numbered from the facing surface F are connected to each other, while at the lower end in the drawing, the ends of the upper layer coil pieces 23 are electrically connected to the ends of the lower layer coil pieces 18 which are formed nearer to the facing surface F than the upper layer coil pieces 23 by one coil piece. In order to make the ends of the upper layer coil pieces 23 and the ends of the lower layer coil pieces 18 formed nearer to the facing surface F than the lower layer coil piece 23 by one coil piece face each other in the thickness direction at the lower end in the drawing, the lower ends of the lower layer coil pieces 18 are formed as the curved regions 18b which are curved in the height direction. The ends of the upper layer coil pieces 23 and the lower layer coil pieces 18 are electrically connected to each other in this way, thereby completing a toroidal coil layer.

As shown in FIG. 2, the upper layer coil pieces 23 are formed in the direction parallel to the track width direction (X-direction in the drawing), and the planar shape of each of the upper layer coil pieces 23 when viewed from above becomes a straight shape. Since the both side ends 22a of the coil insulation base layer 22 are formed to extend in the direction parallel to the height direction, all the upper layer coil pieces 23 are formed in the direction orthogonal to the both side ends 22a. As a result, when the upper layer coil pieces 23 are plated from the top of the coil insulation base layer 22 by the downward steps G to the top of the coil insulating layer 19, and when a punched pattern of the upper layer coil pieces 23 is formed on a resist layer by exposure development, deterioration in shape precision of the punched pattern caused by irregular deflection can be suppressed as compared with the related art, so that the upper layer coil pieces 23 can be formed with high precision. Therefore, it is possible to appropriately suppress problems as in the related art, for example, a problem where adjacent upper layer coil pieces 23 may be connected to each other to cause short circuiting, or a problem where defective portions such as holes may be formed in the upper layer coil pieces 23.

Moreover, as shown in FIG. 5, each of the lower layer coil pieces 18 is provided with the straight region 18a extending in the track width direction (X-direction in the drawing) that is the same direction as the direction that the upper layer coil pieces 23 extend, whereby the length of a coil formation region of the lower layer coil pieces 18 in the height direction (Y-direction in the drawing) can be reduced in the region where the straight region is formed. Therefore, if the main magnetic pole layer 20 is formed to overlap, particularly, only the straight region 18a of each of the lower layer coil pieces 18, the length of the main magnetic pole layer 20 in the height direction can be reduced as compared with the conventional shape in FIG. 17. Thus, the yoke length from the main magnetic pole layer 20 to the return path layer 27 can be reduced. As a result, deterioration in recording efficiency caused by an increase in inductance, etc. can be appropriately suppressed. As shown in FIG. 5, by providing one end of each of the lower layer coil pieces 18 with the curved region 18b extending in the height direction (Y-direction in the drawing) so as to electrically connect the lower layer coil pieces 18 and the upper layer coil pieces 23 to each other in a toroidal shape, the lower layer coil pieces 18 which are surely connected to the upper layer coil pieces 23 extending in the direction to the track width direction, can be surely formed with a simple structure.

Figure 6:
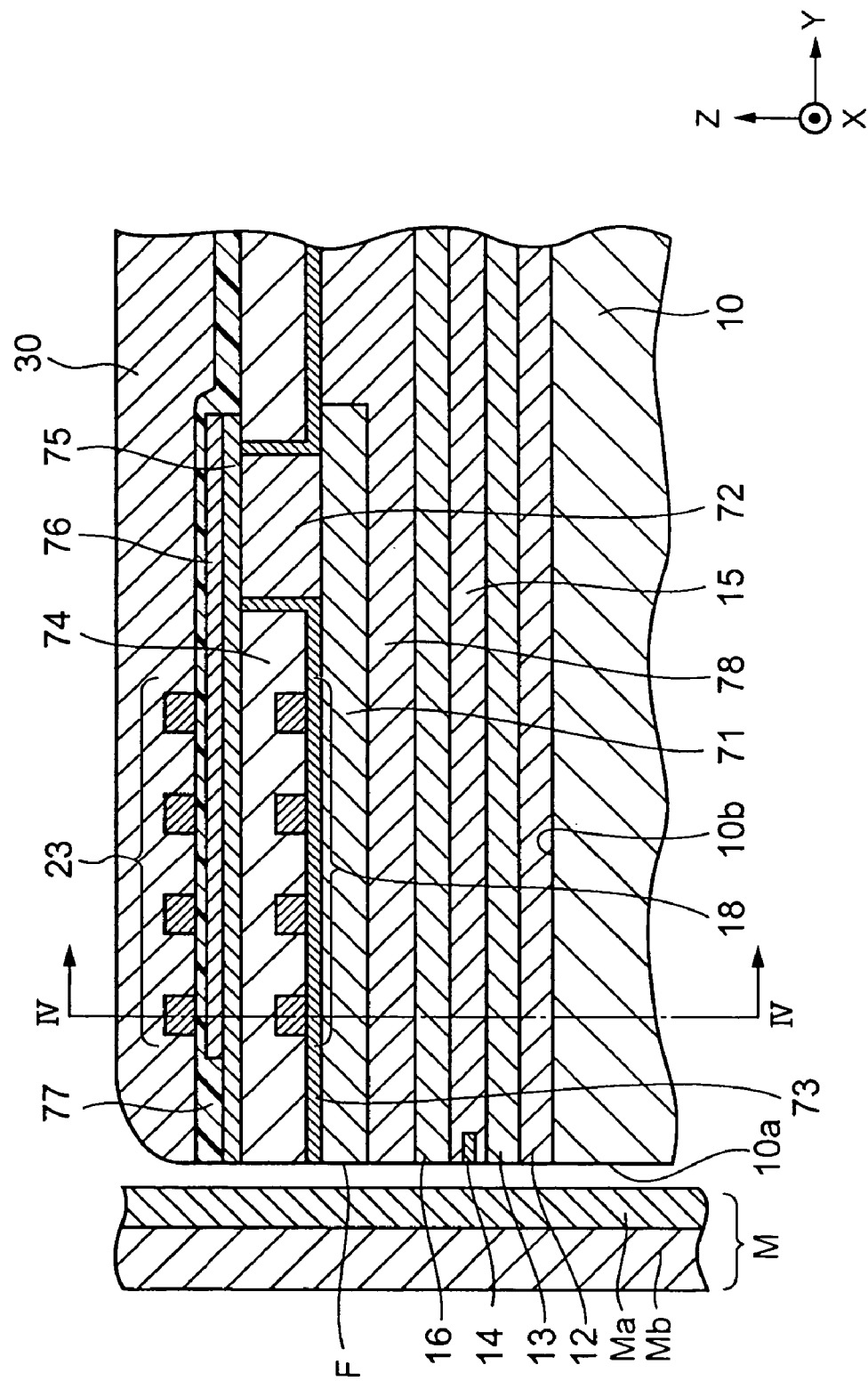
FIG. 6 is a partial longitudinal sectional view of a vertical magnetic recording head according to a second embodiment of the invention.
Figure 7:
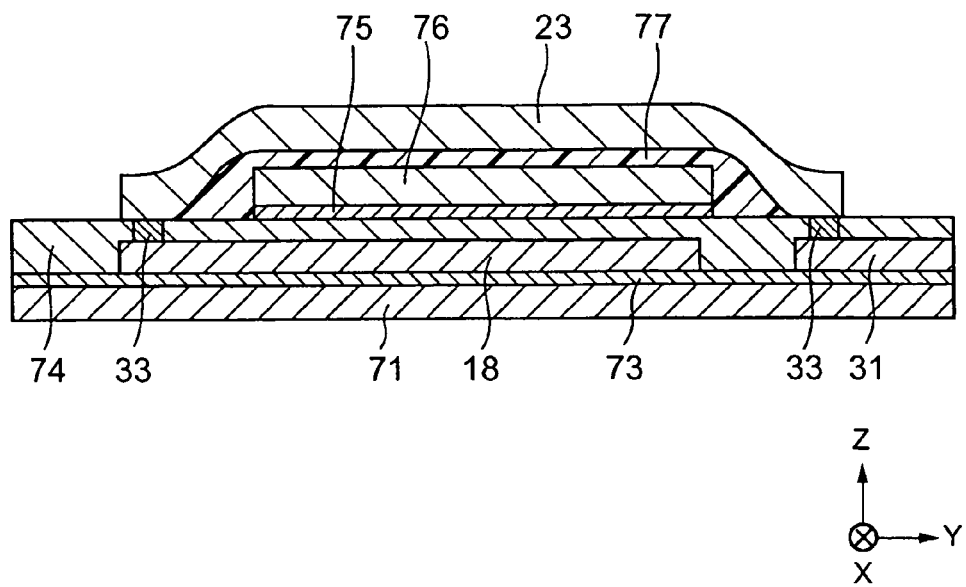
FIG. 7 is a partial sectional view when the magnetic head is cut along line IV-IV shown in FIG. 6 in a direction parallel to a track width direction (X-direction in the drawing), and the section is viewed from the direction of arrows.

FIG. 6 is a partial longitudinal sectional view of a vertical magnetic recording head according to a second embodiment of the invention, and FIG. 7 is a partial sectional view when the magnetic head shown is cut along line IV-IV shown in FIG. 6 in the direction parallel to the track width direction (X-direction in the drawing), and the section is viewed from the direction of arrows. In addition, the layers having the same reference numerals as those in FIG. 1 indicate the same layers as those in FIG. 1.

In FIG. 6, a non-magnetic insulating layer 70 is formed on the main shield layer 16, and a return path layer 71 (first magnetic layer) is formed on the non-magnetic insulating layer 70. A protruding back yoke layer 72 is formed at a rear portion of the return path layer 71 in the height direction, and lower layer coil pieces 18 are formed through a coil insulation base layer 73 (third insulating layer) between the return path layer 71 and the back yoke layer 72. Since an upper surface of the non-magnetic insulating layer 70 and an upper surface of the return path layer 71 are subjected to planarizing, an upper surface of the coil insulation base layer 73 to be formed on the non-magnetic insulating layer 70 and the return path layer 71 also becomes a planarized surface.

The shape of the lower layer coil pieces 18 is the same as that described in reference to FIG. 5. In FIG. 6, the lower layer coil pieces 18 are covered with a coil insulating layer 74 (second insulating layer), and an upper surface of the coil insulating layer 74 and an upper surface of the back yoke layer 72 are subjected to planarizing. A main magnetic pole layer 75 (second magnetic layer) is formed on the coil insulating layer 74, and a yoke layer 76 is provided on the main magnetic pole layer 75 at a position away from the facing surface F in the height direction. Upper layer coil pieces 23 are formed on a coil insulation base layer (first insulating layer) 77 which covers the main magnetic pole layer 75 and the yoke layer 76. The shape of the upper layer coil pieces 23 are the same as that described in reference to FIGS. 1 to 5.

The vertical magnetic recording head shown in FIGS. 6 and 7 is different from the vertical magnetic recording head shown in FIGS. 1 to 5 in that the main magnetic pole layer 75 is provided above the return path layer 71 in the film thickness direction. In FIGS. 6 and 7, the lower layer coil pieces 18 are provided between the main magnetic pole layer 75 and the return path layer 71, and the upper layer coil pieces 23 are provided on the main magnetic pole layer 75. As can be seen from FIGS. 6 and 7, the lower layer coil pieces 18 has a restriction in that it is formed in the space surrounded by the return path layer 71 and the back yoke layer 72. As a formation region of the lower layer coil pieces 18 extends in the height direction, it is also necessary to extend the return path layer 71 in the height direction. As a result, the length of the main magnetic pole layer 75 in the height direction increases, which may result in an increase in the yoke length. Accordingly, the height length of the coil formation region of the lower layer coil pieces 18 is intended to be as short as possible. According to the invention, since the height length of the coil formation region of the lower layer coil pieces 18 can be effectively reduced as described above, the yoke length in the configuration of the vertical magnetic recording head in FIGS. 6 and 7 can be appropriately reduced as compared with the related art.

Figure 8:
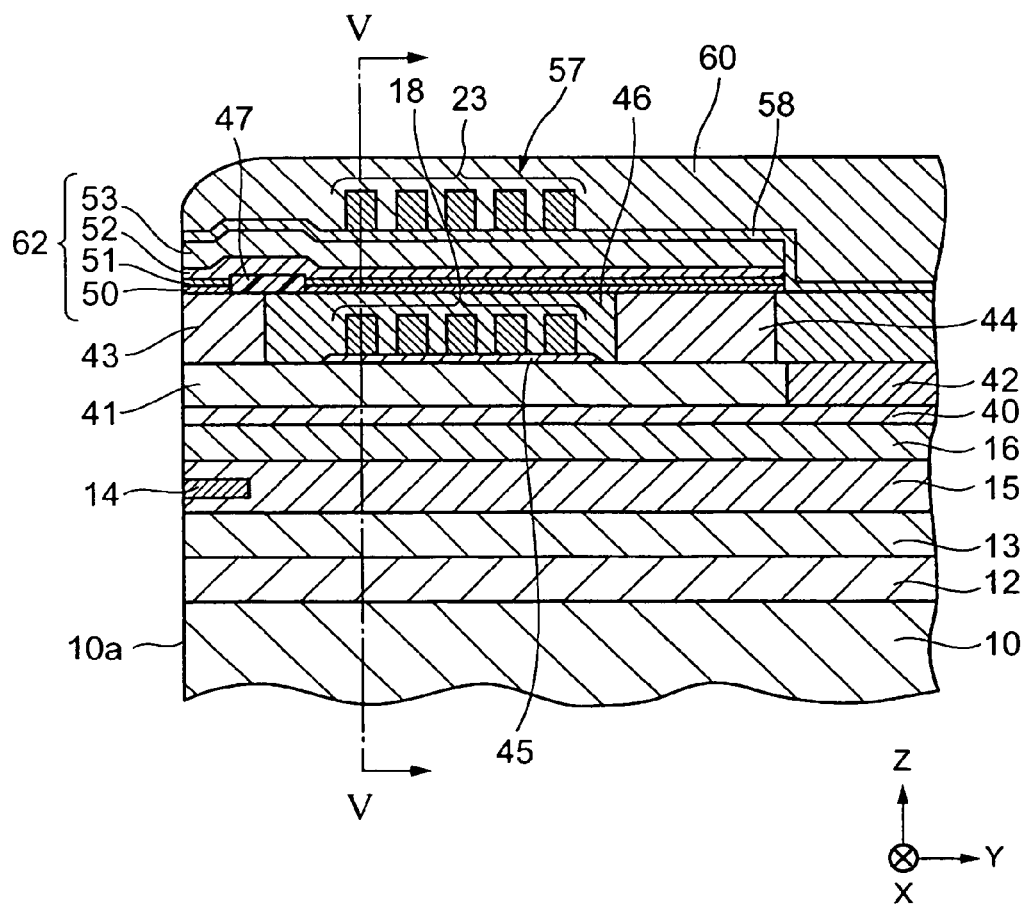
FIG. 8 is a partial longitudinal sectional view of a thin-film magnetic head according to a third embodiment of the invention.
Figure 9:
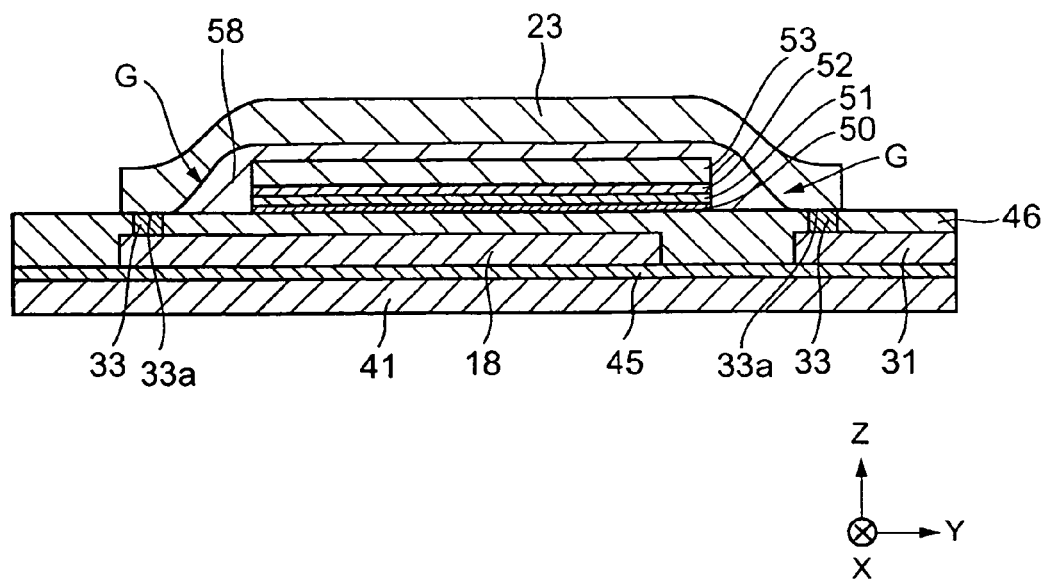
FIG. 9 is a partial sectional view when the thin-film magnetic head is cut along line V-V shown in FIG. 8 in a direction parallel to a track width direction X-direction in the drawing), and the section is viewed from the direction of arrows. In addition, the layers having the same reference numerals as those in FIG. 1 indicate the same layers as those in FIG. 1.

FIG. 8 is a partial longitudinal sectional view of a thin film magnetic head according to a third embodiment of the invention, and FIG. 9 is a partial sectional view when the thin film magnetic head is cut along line V-V shown in FIG. 8 in the direction parallel to the track width direction (X-direction in the drawing), and the section is viewed from the direction of arrows. In addition, the layers having the same reference numerals as those in FIG. 1 indicate the same layers as those in FIG. 1.

As shown in FIG. 8, a separation layer 40 formed of $Al_2O_3$ is formed on the upper shield layer 16, and a lower core layer 41 (first magnetic layer) is formed on the separation layer 40. The lower core layer 41 is formed of a magnetic material such as an NiFe-based alloy. The lower core layer 41 is formed with a predetermined length in the height direction (Y-direction in the drawing) from the facing surface F. A non-magnetic insulating material layer 42 is provided further behind a rear end surface of the lower core layer 41 in the height direction and on both sides of the lower core layer 41 in the track width direction (X-direction). As shown in FIG. 8, the surface of each layer of the lower core layer 41 and the non-magnetic insulating material layer 42 is a planarized continuous surface.

A swelled layer 43 is formed on the lower core layer 41 with a predetermined length in the height direction (Y-direction in the drawing) from the facing surface F to the recording medium. Moreover, a back gap layer 44 is formed on the lower core layer 41 at a position spaced by a predetermined distance in the height direction (Y-direction in the drawing) from a rear end surface of the swelled layer 43 in its height direction.

The swelled layer 43 and the back gap layer 44 may be formed of a magnetic material, or may be formed of the same material as the lower core layer 41. Otherwise, they may be formed of different materials. Also, the swelled layer 43 and the back gap layer 44 may be formed with a single-layered structure or a multi-layered laminated structure. The swelled layer 43 and the back gap layer 44 are magnetically connected to the lower core layer 41.

As shown in FIG. 8, a coil insulation base layer 45 (third insulating layer) is formed on the lower core layer 41 between the swelled layer 43 and the back gap layer 44, and lower layer coil pieces 18 having the same shape as that in FIG. 5 are formed parallel to the height direction.

The lower layer coil pieces 18 are buried by a coil insulating layer 46 (second insulating layer) formed of an inorganic insulating material such as $Al_2O_3$. As shown in FIG. 8, the upper surface of the swelled layer 43, the upper surface of the coil insulating layer 46, and the upper surface of the back gap layer 44 is formed as a planarized continuous surface.

As shown in FIG. 9, a connecting layer 33 is formed to protrude from the ends of the lower layer coil pieces 18 in the track width direction (X-direction in the drawing). As shown in FIG. 9, an upper surface 33a of the connecting layer 33 formed on the ends of the lower layer coil pieces 18 in the track width direction X-direction in the drawing) is formed on the same surface as the upper surface of the coil insulating layer 46.

As shown in FIG. 8, a Gd defining layer 47 is formed on the planarized surface of the swelled layer 43 and the coil insulating layer 46 in the height direction from a position spaced by a predetermined distance in the height direction (Y-direction in the drawing) from the facing surface F.

As shown in FIG. 8, a lower magnetic layer 50 and a gap layer 51 are formed sequentially from below on the swelled layer 43 from the facing surface F to a front end surface of the Gd defining layer 47, on the coil insulating layer 46 in the height direction from a rear end surface of the Gd defining surface 47, and the back gap layer 44. The lower magnetic layer 50 and the gap layer 51 are plated.

Also, as shown in FIG. 8, an upper magnetic layer 52 is plated on the gap layer 51 and the Gd defining surface 47, and an upper core layer 53 is plated on the upper magnetic layer 52.

In this embodiment, four layers, i.e., the lower magnetic layer 50, the gap layer 51, the upper magnetic layer 52 and the upper core layer 53 constitute a magnetic layer (second magnetic pole layer) 62.

As shown in FIGS. 8 and 9, a coil insulation base layer (first insulating layer) 58 formed of, for example, an insulating material such as $Al_2O_3$, is formed on the upper core layer 53. The core insulation base layer 58 is formed of an inorganic insulating material or an organic insulating material, and the core insulation base layer 58 is also formed on the coil insulating layer 46 which is widened on both sides of the magnetic pole layer 62 in the track width direction (X-direction in the drawing). It is preferable that the coil insulation base layer 58 be formed of an organic insulating material. Alternatively, the core insulation base layer 58 may be composed of a thin film layer formed on the upper surface of the magnetic pole layer 62 and a thick film layer formed on both sides of the magnetic pole layer 62. The thin film layer may be formed of an inorganic insulating material and the thick film layer may be formed of an organic insulating material. This can make the magnetic pole layer 62 and the upper layer coil pieces 23 approach each other, thereby improving magnetizing efficiency, and can maintain the insulation between the magnetic pole layer 62 and the upper layer coil pieces 23 satisfactorily on both sides of the magnetic pole layer 62 in the track width direction.

On the core insulation base layer 58, a plurality of upper layer coil pieces 23 with the same shape as that shown in FIG. 2 are formed in the height direction (Y-direction in the drawing).

The upper magnetic layer 52 of the thin film magnetic head shown in FIGS. 8 and 9 is formed in almost the same shape as the main magnetic pole layer 20 shown in FIG. 2. However, the thin film magnetic head in FIGS. 8 and 9 is a magnetic head using an in-plane recording method, which is different from that in FIG. 1.

The magnetic head shown in FIGS. 8 and 9 also has a structure in which a toroidal coil layer is wound around the magnetic pole layer 62 that is a magnetic layer serving as an axis, and the toroidal coil layer is composed of the lower layer coil pieces 18, the upper layer coil pieces 23 and the connecting layer 33.

Similar to that shown in FIG. 2, the upper layer coil pieces 23 are formed in the direction parallel to the track width direction (X-direction in the drawing), so that the planar shape of each of the upper layer coil pieces 23 when viewed from above becomes a toroidal shape. The both side ends of the coil insulation base layer 58 is formed to extend in the direction parallel to the height direction, and therefore the upper layer coil pieces 23 are formed in a direction orthogonal to the both side ends. As a result, when the upper layer coil pieces 23 are plated from the top of the coil insulation base layer 58 through the gaps G to the top of the coil insulating layer 46 and when a punched pattern of the upper layer coil pieces 23 is formed on a resist layer by exposure development, deterioration in shape precision of the punched pattern caused by irregular deflection can be suppressed as compared with the related art, so that the upper layer coil pieces 23 can be formed with high precision. Therefore, it is possible to appropriately suppress problems as in the related art, for example, a problem that adjacent upper layer coil pieces 23 may be connected to each other to cause short circuiting, or a problem that defective portions such as holes may be formed in the upper layer coil pieces 23.

Also, similar to that shown in FIG. 5, each of the lower layer coil pieces 18 is provided with the straight line 18a extending in the track width direction X-direction in the drawing) that is the same direction as the direction that the upper layer coil pieces 23 extend, whereby the length of the coil formation region of the lower layer coil pieces 18 in the height direction (Y-direction in the drawing) can be reduced in the region where the straight regions 18a are formed. Therefore, if the straight regions 18a of the lower layer coil pieces 18 are formed in the space surrounded by the lower core layer 41, the swelled layer 43 and the back gap layer 44, and the curved regions 18b are formed to protrude from both sides within the space, the length of the lower core layer 41 in the height direction can be effectively reduced, and the length of the magnetic pole layer 62 in the height direction can be reduced. Thus, the yoke length from the main magnetic pole layerr 62 to the back gap layer 44 and the lower core layer 41 can be reduced. As a result, deterioration in recording efficiency caused by an increase in inductance, etc. can be appropriately suppressed. Also, by providing one end of each of the lower layer coil pieces 18 with the curved region 18b extending in the height direction (Y-direction in the drawing) so as to electrically connect the lower layer coil pieces 18 and the upper layer coil pieces 23 to each other in a toroidal shape, the lower layer coil pieces 18 which are surely connected to the upper layer coil pieces 23 extending in the direction parallel to the track width direction can be surely formed with a simple structure.

FIGS. 10 to 14 are views showing steps of a process of manufacturing the magnetic head shown in FIG. 1. In particular, a method of forming a toroidal coil layer will be described below. In addition, the drawings other than FIGS. 10 to 14 can be used in some cases.

First, as shown in FIG. 5, lower layer coil pieces 18 are plated on the coil insulation base layer 17 (third insulating layer). Then, a resist layer (not shown) is coated on the coil insulation base layer 17, and a punched pattern with the same shape as the lower layer coil pieces 18 is formed on the resist layer by exposure development. Simultaneously with the formation of the punched pattern of the lower layer coil pieces 18, a punched pattern of the lead layers 31 and 32 is also formed on the resist layer by exposure development.

In order to form each of the lower layer coil pieces 18 in a shape having a straight region 18a extending in the direction parallel to the track width direction X-direction in the drawing) and a curved region 18b curved in the height direction (Y-direction in the direction) from one end of the straight region 18a, spaces corresponding to the straight region and the curved region are formed in the punched pattern by exposure development, then the lower layer coil pieces 18 are plated within the punched pattern, and thereafter the resist layer is removed. It is preferable that the lower layer coil pieces 18 be plated on the flat coil insulation base layer 17. This allows the pattern of the lower layer coil pieces 18 to be formed with high precision without deteriorating the pattern precision of the curved regions 18b of the lower layer coil pieces 18 due to irregular deflection when a resist layer is exposed and developed.

Figure 10:
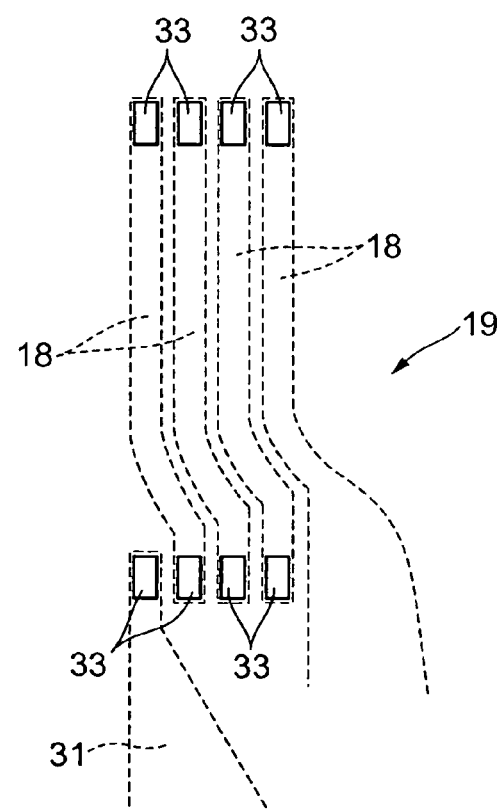
FIG. 10 is a view showing a step of a process of manufacturing the magnetic head shown in FIG. 1, and particularly, a view for explaining a method of forming a toroidal coil layer, and a partial plan view of the magnetic head during the manufacturing process.

As shown in FIG. 10 (partial plan view), a connecting layer 33 is plated on connecting ends of the lower layer coil pieces 18 and the lead layer 31. Then, the lower layer coil pieces 18, the lead layers 31 and 32 and the connecting layer 33 are covered with a coil insulating layer 19 (second insulating layer). The coil insulating layer 19 is patterned with, for example, an inorganic insulating material such as $Al_2O_3$.

Figure 11:
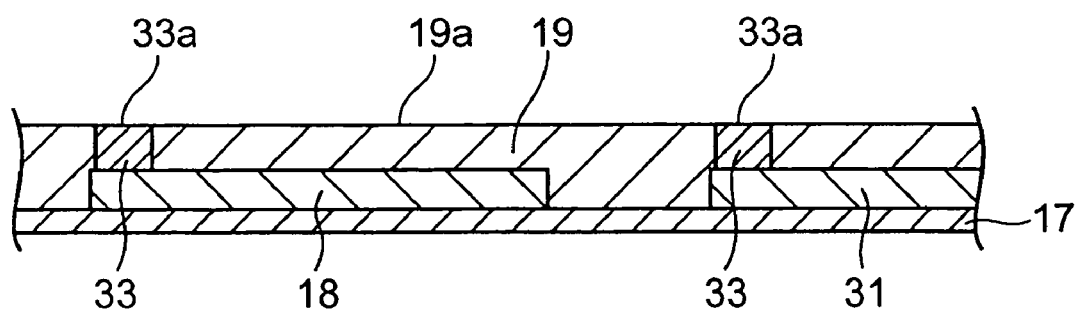
FIG. 11 is a view showing a step of the process of manufacturing the magnetic head shown in FIG. 1, and in particular, a view for explaining the method of forming a toroidal coil layer, and a partial sectional view of the magnetic head during the manufacturing process.
Figure 12:
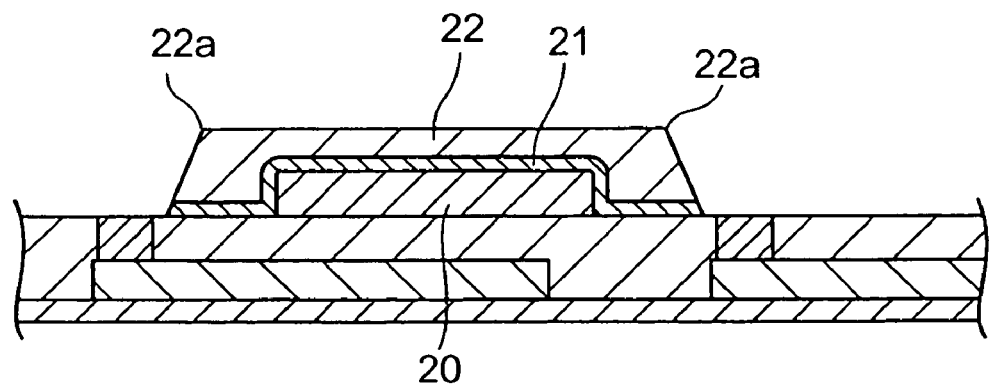
FIG. 12 is a partial sectional view showing a step subsequent to that in FIG. 11.

As shown in FIGS. 10 and 11 (partial plan views at the same position as the sectional view of FIG. 3), an upper surface 19a of the coil insulating layer 19 is subjected to planarizing by using a CMP technique, etc., and then an upper surface 33a of the connecting layer 33 is exposed through the upper surface 19a of the coil insulating layer 19. Next, in a step shown in FIG. 11, a main magnetic pole layer 20 is formed on the coil insulating layer 19 by, for example, plating. The planar shape of the main magnetic pole layer 20 is the same as that shown in FIG. 2. Next, a gap layer 21 is formed on the main magnetic pole layer 20 by sputtering, etc. In addition, since upper layer coil pieces 23 and the connecting layer 33 cannot be electrically connected to each other in any post steps if the upper surface 33a of the connecting layer 33 has been covered with the gap layer 21, for example, a resist layer is used so that the gap layer 21 is not formed on the upper surface 33a of the connecting layer 33 in advance. Otherwise, if the upper surface 33a of the connecting layer 33 has been covered with the gap layer 21, it is necessary to partially remove the gap layer 21 covering the upper surface 33a of the connecting layer 33 in any post steps.

Moreover, a coil insulation base layer 22 (first insulating layer) made of a resist, etc. is formed on the gap layer 21. The both side ends 22a of the coil insulation base layer 22 in the track width direction X-direction in the drawing) are formed to extend in the direction parallel to the height direction (Y-direction in the drawing), as shown in FIG. 2. In particular, since both side ends 20d, in the track width direction, of the rear portion S3 constituting the main magnetic pole layer 20 are formed to extend in the direction to the height direction, the both side ends 22a of the coil insulation base layer 22 in a portion formed to overlap the rear portion S3 can be easily formed to extend in the direction parallel to the height direction. As shown in FIG. 2, the top of the rear portion S3 of the main magnetic pole layer 20 is a region where the upper layer coil pieces 23 are formed, with the coil insulation base layer 22 therebetween. According to the invention, since the both side ends 22a of the coil insulation base layer 22 where the upper layer coil pieces 23 are to be formed, are formed to extend in the direction parallel to the height direction with high precision, it is preferable that the both side ends 20d of the rear portion S3 of the main magnetic pole layer 20 which is located at a position facing the formation region of the upper layer coil pieces 23 in the thickness direction be formed to extend in the direction parallel to the height direction.

Figure 13:
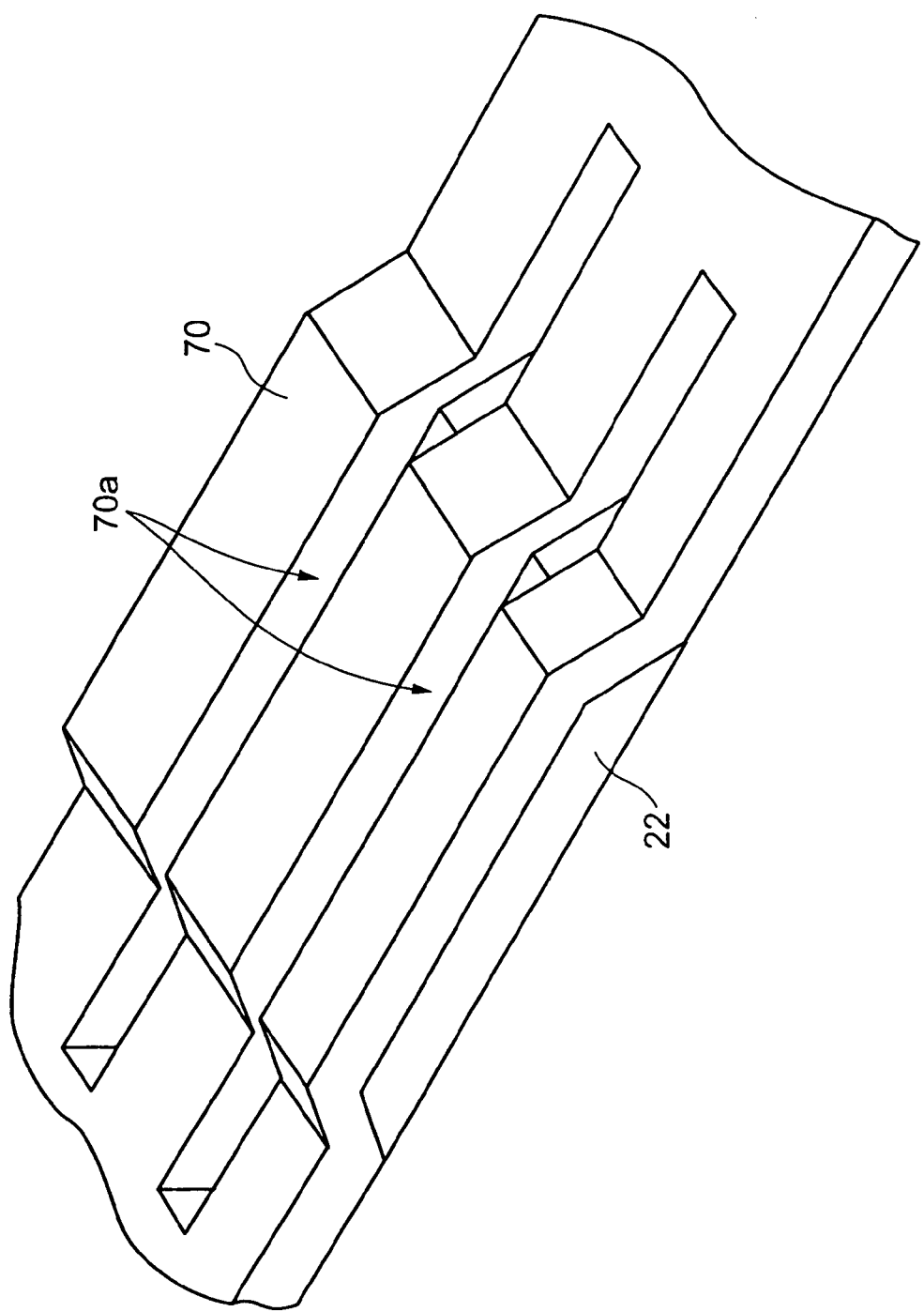
FIG. 13 is a view showing a step of the process of manufacturing the magnetic head shown in FIG. 1, and in particular, a view for explaining the method of forming a toroidal coil layer, and a partial perspective view of the magnetic head during the manufacturing process.

Next, as shown in FIG. 13 (partially enlarged perspective view of the magnetic head in the manufacturing process), a resist layer 70 is formed on the coil insulation base layer 22, and a punched pattern 70a of the upper layer coil pieces 23 is formed by exposure development. As shown in FIG. 2, in order to form the upper layer coil pieces 23 in the direction parallel to the track width direction (X-direction in the drawing) when viewed from above, the punched pattern 70a is formed in the direction parallel to the track width direction. The spot where the punched pattern 70a is formed is a spot where the resist layer 70 is exposed and developed. Since the punched pattern 70a is formed in the direction parallel to the track width direction X-direction in the drawing) that is the direction orthogonal to the direction (height direction) that the both side ends 22a of the coil insulation base layer 22 extend, it is possible to form the punched pattern 70a with high precision without disordering the shape of the punched pattern 70a due to irregular deflection in exposure development when the punched pattern 70a is formed.

Figure 14:
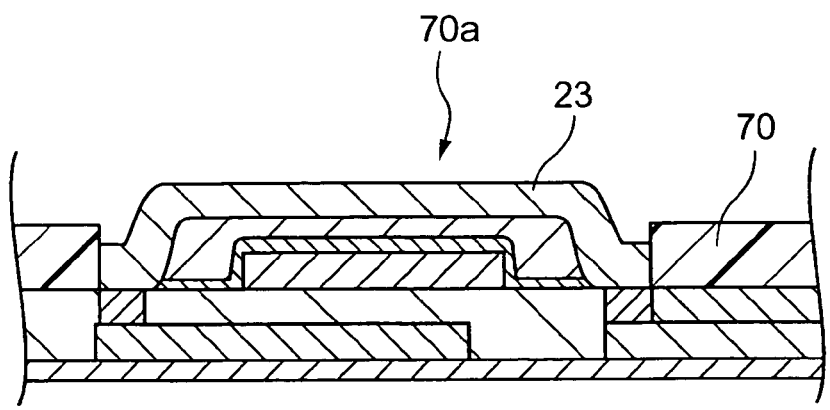
FIG. 14 is a partial sectional view showing a step subsequent to that in FIG. 13.
Figure 15:
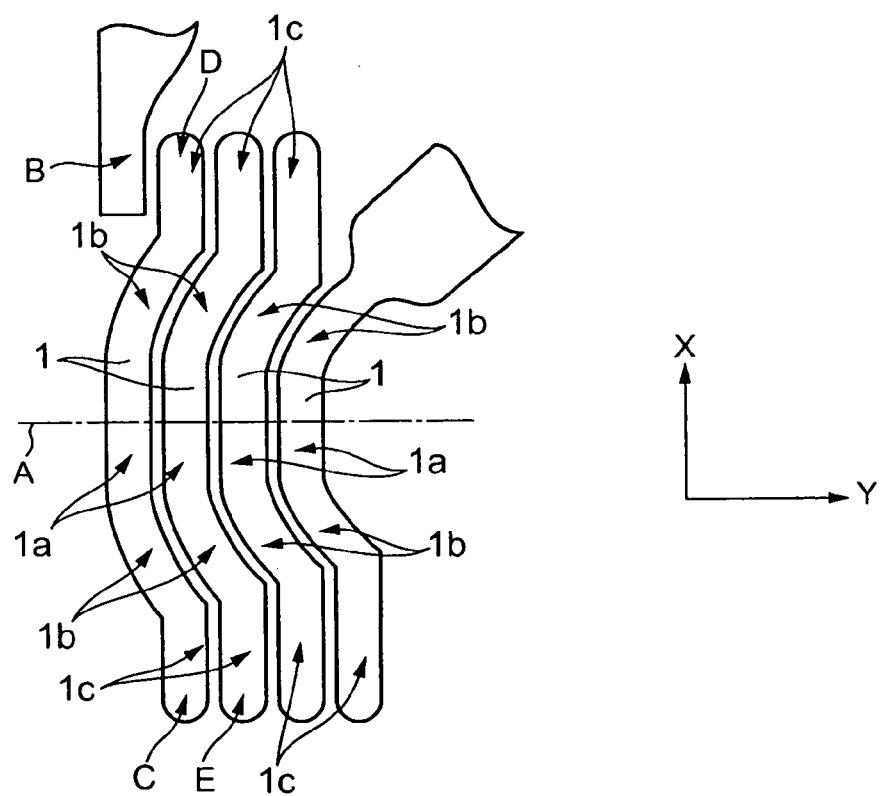
FIG. 15 is a partial plan view showing a conventional shape of lower layer coil pieces.
Figure 16:
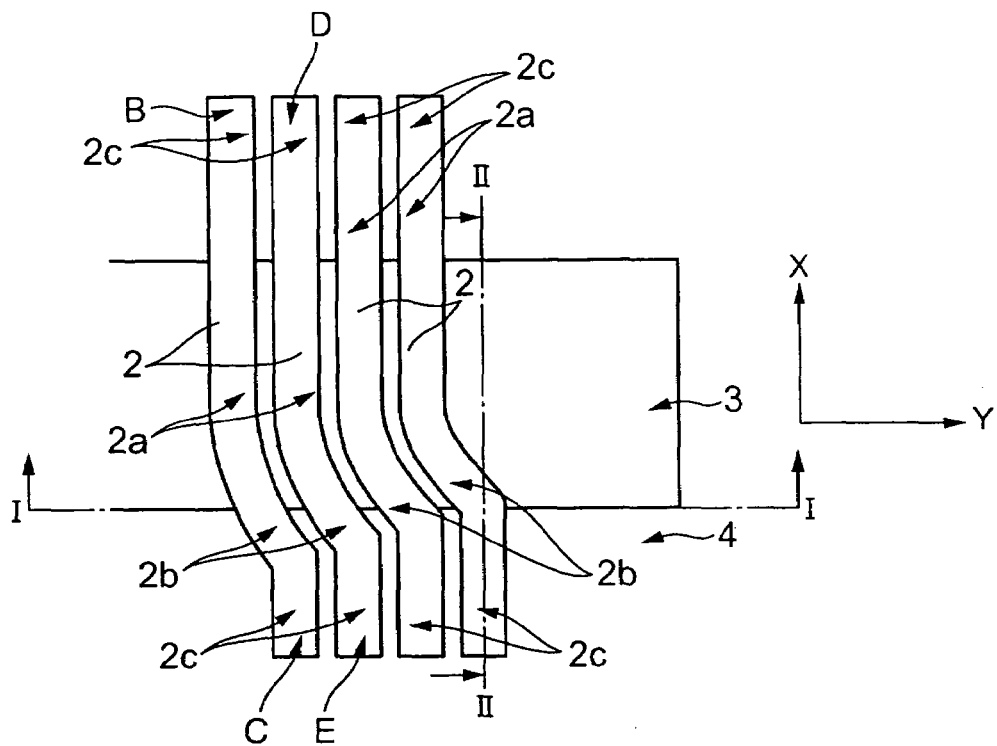
FIG. 16 is a partial plan view showing a conventional shape of upper layer coil piece.

Then, referring to FIG. 14 (partial sectional view at the same position as the sectional view of FIG. 3), upper layer coil pieces 23 are plated within the punched pattern 70a and then the resist layer 70 is removed. As described above, since the punched pattern 70a can be formed with high precision, it is possible to appropriately avoid occurrence of a problem that the adjacent upper layer coil pieces 23 may be connected to each other.

In the invention, the structure of the magnetic head is not particularly limited to those described above. Further, even though the above description has been made of the configuration in which all the curved regions 18b provided in the lower layer coil pieces 18 are curved in the height direction, the curved regions may be curved toward the facing surface F. It should be noted that it is preferable from the viewpoint of reduction in the yoke length that the curved regions 18b are curved in the height direction because the straight regions 18a can be formed closer to the facing surface F. Further, as shown in FIG. 5, each of the curved regions 18b can be divided into a portion curved in the height direction and a portion extending in the direction parallel to the track width direction (X-direction in the drawing) from the curved portion to the connection regions 18c. In this case, particularly the curved portion may have a linearly extending inclined shape, or the portions extending to the connection regions 18c in the direction parallel to the track width direction (X-direction in the drawing) may not be formed.

According the invention, the upper layer coil pieces to be formed on an insulating layer having a step can be formed in a predetermined shape with high precision, and the recording efficiency can be improved.

The invention claimed is:

1. A magnetic head comprising:
a first magnetic layer, a second magnetic layer facing the first magnetic layer with a predetermined distance above the first magnetic layer, and a toroidal coil layer formed to be wound around either the first magnetic layer or the second magnetic layer, serving as an axis,
wherein the toroidal coil layer has a plurality of lower layer coil pieces provided below the magnetic layer serving as an axis and arrayed in a height direction from a facing surface to a recording medium, and a plurality of upper layer coil pieces provided above the magnetic layer serving as an axis and arrayed in the height direction from the facing surface, and ends of the lower layer coil pieces in a track width direction are electrically connected to ends of the upper layer coil pieces in the track width direction, respectively,
wherein the upper layer coil pieces are formed to extend from a top of a first insulating layer by downward steps on sides in the track width to a top of a second insulating layer which is widened at ends of the first insulating layer, at least in a region where the upper layer coil pieces are formed, side ends of the first insulating layer in the track width direction extend in a direction parallel to the height direction, and the lower layer coil pieces are formed on a third insulating layer,
wherein the upper layer coil pieces are formed in a direction orthogonal to a direction that the side ends of the first insulating layer extend,
wherein each of the lower layer coil pieces is formed on the third insulating layer so as to have a straight region located below the magnetic layer serving as an axis and extending in the same direction as the direction that the upper layer coil pieces extend and a curved region curved toward the facing surface or in the height direction on one end in the track width direction,
wherein an end of the straight region is electrically connected to one end of each of the upper layer coil pieces, and an end of the curved region is electrically connected to another end of each of the upper layer coil pieces,
wherein the upper layer coil pieces and straight regions of the lower layer coil pieces face to each other in thickness direction,
wherein the magnetic layer serving as the axis is formed to overlap only a straight region of each of the lower layer coil pieces, the curved region of each of the lower layer coil pieces is located outside of the magnetic layer serving as an axis,
wherein a connecting layer is formed on the straight region and the curved region, respectively, so as to protrude upward, an upper surface of the connecting layer is formed with the same surface as an upper surface of the second insulating layer, and the ends of the upper layer coil pieces are electrically connected to the upper surface of the connecting surface,
wherein the magnetic layer serving as the axis is formed on a planarized surface of the second insulating layer, and
wherein the first insulating layer is formed of an organic insulating material.

2. The magnetic head according to claim 1,
wherein a coil formation surface of the third insulating layer is formed as a planarized surface.

3. A magnetic head comprising:
a first magnetic layer, a second magnetic layer facing the first magnetic layer with a predetermined distance above the first magnetic layer, and a toroidal coil layer formed to be wound around either the first magnetic layer or the second magnetic layer, serving as an axis,
wherein the toroidal coil layer has a plurality of lower layer coil pieces provided below the magnetic layer serving as an axis and arrayed in a height direction from a facing surface to a recording medium, and a plurality of upper layer coil pieces provided above the magnetic layer serving as an axis and arrayed in the height direction from the facing surface, the upper layer coil pieces are formed to extend from a top of a first insulating layer by downward steps on sides in the track width to a top of a second insulating layer which is widened at ends of the first insulating layer, at least in a region where the upper layer coil pieces are formed, side ends of the first insulating layer in the track width direction extend in a direction parallel to the height direction, and the lower layer coil pieces are formed on a third insulating layer,
wherein the upper layer coil pieces are formed in a direction orthogonal to a direction that the side ends of the first insulating layer extend,
wherein each of the lower layer coil pieces is formed on the third insulating layer so as to have a straight region located below the magnetic layer serving as an axis and extending in the same direction as the direction that the upper layer coil pieces extend and a curved region curved toward the facing surface or in the height direction on one end in the track width direction, and wherein an end of each of the lower layer coil pieces is electrically connected to one end of each of the upper layer coil pieces, and another end of each of the lower layer coil pieces is electrically connected to another end of each of the upper layer coil pieces, wherein the upper layer coil pieces and straight regions of the lower layer coil pieces face to each other in thickness direction, wherein the magnetic layer serving as the axis is formed to overlap only a straight region of each of the lower layer coil pieces, wherein a connecting layer is formed on the ends of the lower layer coil pieces, respectively, so as to protrude upward, an upper surface of the connecting layer is formed with the same surface as an upper surface of the second insulating layer, and the ends of the upper layer coil pieces are electrically connected to the upper surface of the connecting surface, wherein the magnetic layer serving as the axis is formed on a planarized surface of the second insulating layer, and wherein the first insulating layer is formed of an organic insulating material.

* * * * *